June 1, 1943. A. C. STOCKER 2,320,483
TUNABLE CIRCUIT
Filed Sept. 30, 1941
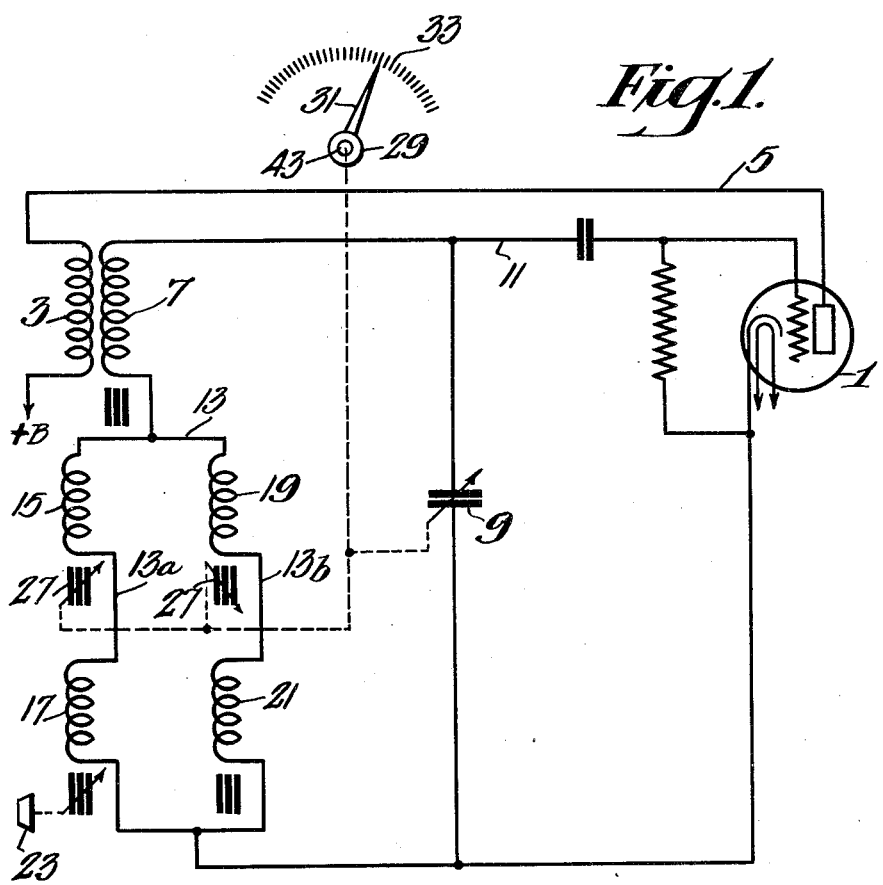
Fig.1.
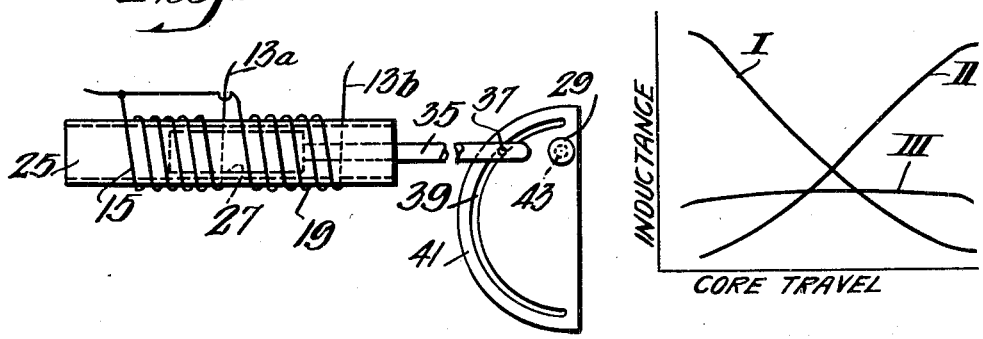
Fig.2.
Fig.3.
Inventor
Arthur C. Stocker
By
J. Huff
Attorney Patented June 1, 1943

2,320,483

UNITED STATES PATENT OFFICE 2,320,483

TUNABLE CIRCUITS

Arthur C. Stocker, Collingswood, N. J., assignor to Radio Corporation of America, a corporation of Delaware Application September 30, 1941, Serial No. 412,949

9 Claims. (Cl. 250—40)

This invention relates to tunable circuits, and more particularly to circuits employing trimmers.

Oscillators and other similar tunable circuits are frequently equipped with direct reading dials and means for trimming the operating frequency to agree with these dials. Thus, variable frequency oscillators are commonly equipped with a widely variable reactance which acts as a tuning control, and a small variable reactance for adjustment of the tuning control, the latter reactance being known as a trimmer. The amount of control given by the trimmer depends upon the operating frequency and upon the percentage change in reactance, so that the trimmers are more effective at one end of the tuning range than at the other.

The worst example of this may be found when the main and trimmer reactors are of the same sign (inductive or capacitive). Assuming a frequency change of 3:1 by the main, or tuning, reactor, then, if the trimmer is 1 percent of the main reactor at its maximum end, it will be 9 percent at the other end, so that the percentage frequency change available varies by $\sqrt{9}$, or 3, over the operating band. Further, the highest percentage change occurs at the highest frequency, so that the actual cycles change available is $3 \times 3$, or 9, at the high frequency end for every one available at the low frequency end.

With the main and trimmer reactors of opposite sign, the percentage change due to the trimmer remains the same, but the actual variation in cycles is proportional to frequency, so that, if a 3:1 band is covered, the trimmer is three times as effective at the high frequency end as it is at the low frequency end.

The primary object of my present invention is to provide a novel tuning circuit incorporating an adjusting trimmer which is not subject to the foregoing defect.

More particularly, it is an object of my present invention to provide a novel trimmer arrangement wherein the action of the primary adjusting trimmer will be constant over the operating range of the apparatus.

It is also an object of my present invention to provide a novel trimmer network which is simple in construction, inexpensive in cost and highly efficient in use.

In accordance with my invention, I provide a trimmer tuning network in circuit with one of the elements of the tunable circuit, the network having two parallel branch circuits. Each of the branch circuits includes two serially connected inductors, one of the inductors of one of the branch circuits being variable and constituting the trimmer inductor, and one of the inductors in the other branch circuit having a fixed value equal approximately to the average value of the trimmer inductor. The other two inductors, one in each of the branch circuits, are arranged to cooperate as a pair and have a common core which is connected to the main tuning element. Thus, the two inductors acting as a pair constitute a balance coil the function of which is to control the effectiveness of the trimmer without changing the total inductance of the network. By making the value of the fixed inductor in the network equal to the average value of the trimmer inductor, the balance coil is enabled to perform its function.

The novel features that I consider characteristic of my invention are set forth with particularity in the appended claims. The invention itself, however, both as to its organization and method of operation, together with additional objects and advantages thereof, will best be understood from the following description, when read in connection with the accompanying drawing wherein Figure 1 is a wiring diagram of an oscillator embodying a trimmer tuning network in accordance with this invention;

Figure 2 is an elevational view of the balance coil structure, and

Figure 3 is a set of curves illustrating the effectiveness of the individual inductors constituting the balance coil in the various positions of the common core therefor.

Referring more particularly to the drawing, wherein similar reference characters designate corresponding parts throughout, there is shown, in Fig. 1, an oscillator tube I having a feedback winding 3 in the plate circuit 5 thereof, the winding 3 being coupled to the grid main inductor 7. The main inductor 7 cooperates with a variable capacitor 9 in the grid circuit 11 of the oscillator I to provide a tunable circuit, the capacitor 9 serving as a main tuning element for tuning the oscillator.

In series with the main inductor 7 is a trimmer network 13 having two parallel branches 13a and 13b. The branch 13a has a pair of serially connected variable inductors 15 and 17, and the branch 13b has a pair of serially connected inductors 19 and 21 of which the inductor 19 is variable and the inductor 21 is fixed. The inductor 17 constitutes the trimmer reactance for adjusting the range of the main tuning capacitor 9, and it may be manually adjusted by means of a knob 23 or the like. The inductor 21 has a value equal approximately to the average value of the trimmer inductor 17.

The inductors 15 and 19 are preferably wound on a common form or tube 25 of insulating material and have a common iron core 27 so arranged that when the core 27 is fully within the winding 15, it is out of the winding 19, and vice versa. Thus, when the core 27 is fully within the winding 15 and entirely out of the winding 19, the inductor 15 has maximum inductance, as shown by the curve I of Fig. 3, and the inductor 19 has minimum inductance, as shown by the curve II of this figure. Conversely, with the core 27 fully inserted in the winding 19 and out of the winding 15, the latter has minimum inductance and the former has maximum inductance, as shown by the same curves. The windings or inductors 15 and 19 are arranged in parallel-aiding relation, and their combined effect is shown by the curve III of Fig. 3. The common core 27 is connected to the control element of the tuning capacitor 9 for unitary action therewith in response to a control knob 29 having a pointer 31 arranged to operate over a scale 33, and for this purpose, the core 27 may have connected thereto one end of an operating rod 35 the other end of which carries a pin 37 received in a cam slot 39 of a cam 41 fixed to the tuning shaft 43 on which the knob 29 is mounted.

As noted heretofore, the capacitor 9 constitutes the main tuning reactance and, together with the inductor 7, may correspond to the tank circuit customarily employed in connection with an oscillator. The trimmer inductor 17 may be adjusted by means of the knob 23 independently of the knob 29 to provide the desired compensation. The effectiveness of the primary inductor 17 is controlled by the cooperating inductors 15 and 19 which constitute a balance coil. As the core 27 is operated simultaneously with adjustment of the tuning condenser 9, it will either decrease or increase the reactance of the inductor 15 and correspondingly increase or decrease the reactance of the inductor 19, as the case may be, thereby changing the reactance of the individual branches 13a and 13b. However, the total reactance of the network is not changed, and the effectiveness of the trimmer inductor therefore remains constant throughout the tuning range of the oscillator circuit.

Although I have shown and described but a single embodiment of my invention, it will be apparent to those skilled in the art that other modifications are possible. I desire, therefore, that my invention shall not be limited except insofar as is made necessary by the prior art and by the spirit of the appended claims.

I claim as my invention:

1. A tunable circuit comprising a fixed reactance element and a variable reactance element, and a trimmer tuning network in circuit with one of said elements, said network comprising two parallel branch circuits each having two series connected inductors, and means for oppositely varying the inductance of a cooperating pair of said inductors of which one is in one of said branch circuits and the other is in the second of said branch circuits for varying the reactance of each of said branch circuits while maintaining the overall reactance of said network substantially constant, whereby the second of the two inductors in one of said branch circuits is rendered variably effective.

2. A tunable circuit comprising a fixed reactance element and a variable reactance element, and a trimmer tuning network in circuit with one of said elements, said network comprising two parallel branch circuits each having two series connected inductors, means for oppositely varying the inductance of a cooperating pair of said inductors of which one is in one of said branch circuits and the other is in the second of said branch circuits for varying the reactance of each of said branch circuits while maintaining the overall reactance of said network substantially constant, and means for varying the inductance of the second of said two inductors in one of said branch circuits.

3. A tunable circuit comprising a fixed reactance element and a variable reactance element, and a trimmer tuning network in circuit with one of said elements, said network comprising two parallel branch circuits each having two series connected inductors, one of said inductors in one of said branch circuits and one of said inductors in the second of said branch circuits cooperating as a pair, means for oppositely varying the inductance of each of said pair of cooperating inductors in predetermined relation to said variable reactance element, and means for varying the inductance of the other of said inductors in one of said branch circuits.

4. A tunable circuit comprising a fixed reactance element and a variable reactance element, and a trimmer tuning network in circuit with one of said element, said network comprising two parallel branch circuits each having two series connected inductors, one of said inductors in one of said branch circuits and one of said inductors in the second of said branch circuits cooperating as a pair, means for oppositely varying the inductance of each of said pair of cooperating inductors in response to tuning variations of said variable reactance element whereby to vary the reactance in each of said branch circuits without substantially changing the overall reactance of said network, the second of said inductors in one of said branch circuits constituting a trimmer inductor, and means for varying the inductance of said trimmer inductor independently of the tuning variations of said variable reactance element for modifying the frequency response of the tunable circuit as determined by said variable reactance element.

5. The invention set forth in claim 4 characterized in that the second inductor in the second of said branch circuits is constituted by a fixed inductor having a value equal substantially to the average value of said trimmer inductor.

6. A tunable circuit comprising a fixed inductive reactance element and a variable capacitive reactance element, and a trimmer tuning network in series with said fixed element, said network comprising two parallel branch circuits one having a first variable inductor and a second variable inductor serially connected to each other, and the other of said branch circuits having a third inductor which is variable and a fourth inductor which is fixed, said third and fourth inductors being also serially connected to each other, said first and third variable inductors cooperating as a pair, means for oppositely varying the inductance of said first and third inductors in response to tuning variations of said variable capacitive reactance element whereby to vary the reactance in each of said branch circuits without substantially changing the overall reactance of said network, said second variable inductor constituting a trimmer inductor, and means for varying the inductance of said trimmer inductor independently of the tuning variations of said variable capacitive reactance element for modifying the frequency response of the tunable circuit as determined by said variable capacitive reactance element, said fourth inductor having a value equal substantially to the average value of said trimmer inductor.

7. In a tunable signal circuit, the combination with inductive and capacitive tuning elements, one of which constitutes a variable main tuning element, of a movable core trimmer inductor connected in said circuit and having a frequency variation range equal approximately to a predetermined percentage of the frequency variation range of said circuit at one end of the tuning range, and a balancing network in circuit with said trimmer inductor, said network including a pair of oppositely variable tuning elements connected to and variable simultaneously with said main tuning element for maintaining the effective range of said trimmer inductor substantially constant throughout the tuning range of said circuit.

8. The invention set forth in claim 7 characterized in that said network includes a second movable core inductor in series with said trimmer inductor and forming therewith one branch of said network, and characterized further in that said network also includes a second branch in parallel relation with said first named branch, said second branch comprising a third movable core variable inductor and a fixed inductor in series therewith, and said second and third movable core inductors constituting said pair of variable tuning elements.

9. The invention set forth in claim 7 characterized in that said network includes a second movable core inductor in series with said trimmer inductor and forming therewith one branch of said network, and characterized further in that said network also includes a second branch in parallel relation with said first named branch, said second branch comprising a third movable core variable inductor and a fixed inductor in series therewith, and said second and third movable core inductors constituting said pair of variable tuning elements.

ARTHUR C. STOCKER.